US005528418A

United States Patent [19]
Bowman, Jr.

[11] Patent Number: 5,528,418
[45] Date of Patent: Jun. 18, 1996

[54] NIGHT AUGMENTED DAY SCOPE

[75] Inventor: Thomas R. Bowman, Jr., Woodbridge, Va.

[73] Assignee: The United States of America as represented by the Secretary of the Navy, Washington, D.C.

[21] Appl. No.: 159,175

[22] Filed: Nov. 30, 1993

[51] Int. Cl.$^6$ ............................. G02B 23/00; H01J 40/14
[52] U.S. Cl. ..................... 359/400; 359/419; 250/214 VT
[58] Field of Search ................................... 359/364, 400, 359/419, 727; 250/214 VT

[56] References Cited

U.S. PATENT DOCUMENTS 4,629,295  12/1986  Vogl ........................................ 359/400
4,822,994   4/1989  Johnson et al. ................... 250/214 VT
4,961,278  10/1990  Johnson et al. ......................... 359/400

Primary Examiner—Georgia Y. Epps
Assistant Examiner—Evelyn A. Lester
Attorney, Agent, or Firm—Milton W. Lee; John E. Holford; Alain L. Bashore

[57] ABSTRACT

A day-night rifle sight, using separate parallel day and night sights combined by means of a beam splitter; is improved by: integrating the housings of the night sight and beam splitter, reducing the outer dimensions, sealing and strengthening the coupling between the from ends of the sights; adding a quick release clamp to the rear ends; reducing the image size of the night sight with a fiber optic taper to match the daysight image and reticule; reducing the size of image forming optics and thereby reducing the inner dimensions of the coupling.

8 Claims, 2 Drawing Sheets

NIGHT AUGMENTED DAY SCOPE

BACKGROUND OF THE INVENTION

1. Field of the Invention

The present invention generally relates to telescopic sights as used on rifles, cameras, other bore sighted equipment or alone for surveillance. In particular it is concerned with electronic night sight modules for use with day sights using imagers or image intensifiers that convert infrared radiation to visible light.

2. Description of Prior Art

Under bright sunlight conditions the telescopic rifle sight is an excellent, low cost solution for selecting targets at great distances. Under less favorable conditions such as heavy overcast, moonlight or starlight an electronic sight using an image intensifier has been used in place of this sight. The light is sensed by a photoemmitter, which is far more sensitive than the eye, and this responds by generating free electrons. These electrons are then multiplied and used to activate a light emitting phosphor. The Photoemitter not only requires less light intensity, but is also sensitive to infrared and ultraviolet that the eye does not see. Similar solid state devices can be made using photodiodes and light-emitting diodes, but these become complicated and generally do not provide as much intensification. Diode devices have also been developed for far-infrared. These produce specialized temperature images, which may not be recognizable, and also require cooling to cryogenic temperatures.

Attempts have been made to combine day and night sights to obtain the advantages of both. An early suggestion was to use a telescopic sight that provided a different image to each of the user's eyes. The user's brain was supposed to combine the two into a single image. This proved to be very disturbing to the user and was discontinued. Separate sights used interchangeably is the generally preferred procedure at this time.

Another approach is illustrated in the U.S. Pat. No. 4,629,295 "NIGHT VISION INSTRUMENT WITH ELECTRONIC IMAGE CONVERTER" granted Dec. 16, 1986 to Georg Vogl. The teachings of this patent have been translated into a night sight module that attaches to the objective end of a day sight. This is identified as the SIMRAD model KN200/250 optical system. While this system does provide a day/night capability, it does not efficiently utilize the capability of its image intensifier tube.

SUMMARY OF THE INVENTION

A prior art day/night sight is converted into an effective military sniper weapon by increasing the focal length and f-number of the objective lens system in the night module. Further improvement is provided by reducing the image size of the screen on the intensifier tube by means of a fiber optic taper to match the input aperture of the day sight and providing an improved mounting to a daysight.

One object of the invention is to provide a day/night sight having a night range and accuracy equal to that of a high caliber sniper rifle.

Another object is to provide a high resolution nightsight that can used for long range night surveillance without eye fatigue.

A further object is to provide a night sight module in a rugged one piece housing, that firmly engages a daysight to prevent damage and/or inaccuracy due to shock and vibration.

A still further object is to provide a module, as above, that utilizes the reticule of the day sight without compromising the accuracy of either sight.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
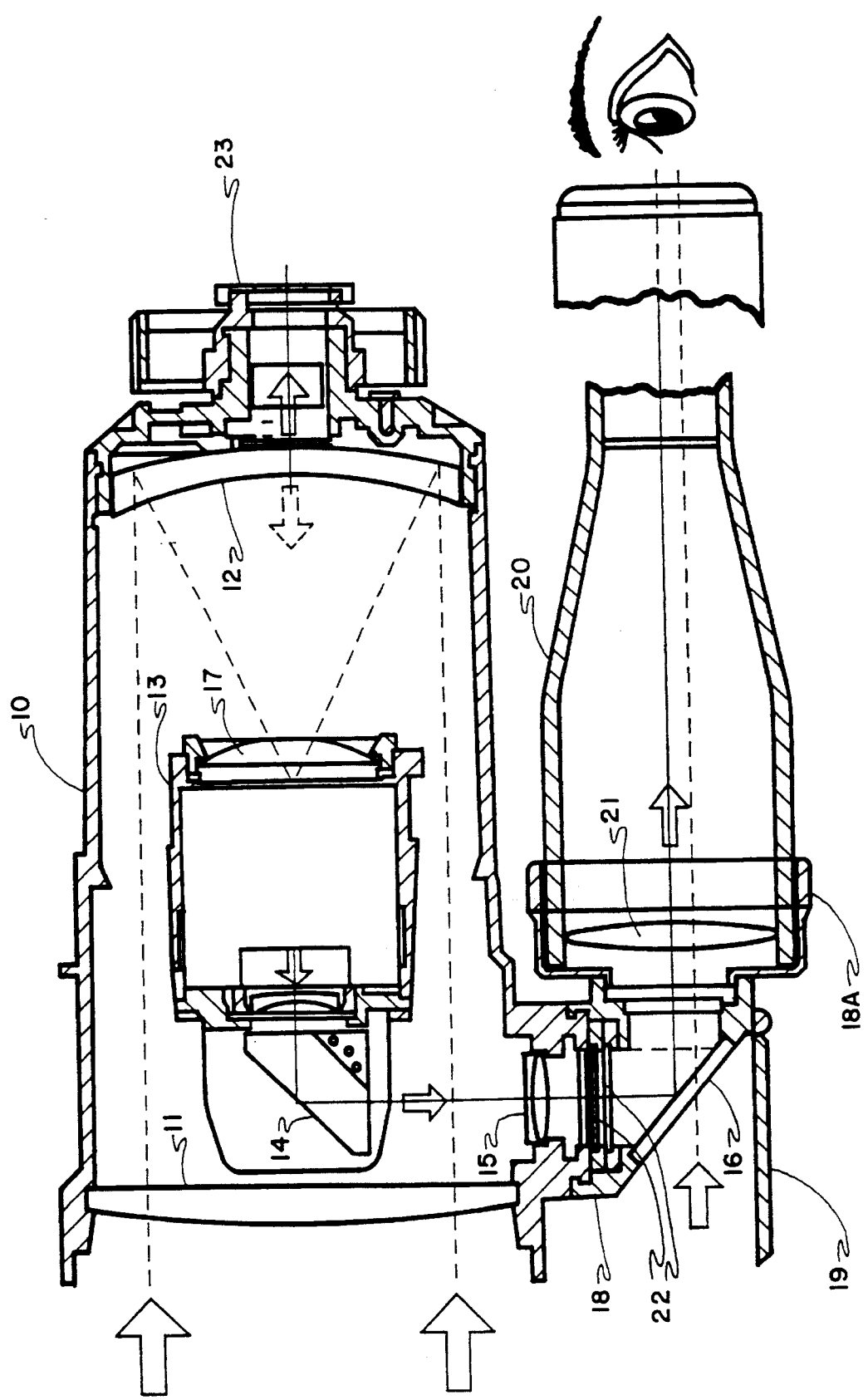
FIG. 1 shows a prior art day/night sight patented in Sweden and marketed by Simrad Optronics A/S of Oslo.

Referring now to the drawings, and more particularly to FIG. 1, there is shown a cutaway plan view of a Day/Night sight Model K200/250. This is a variation of a "Night Vision Instrument with Electronic Image Converter" disclosed in U.S. Pat. No. 4,629,295 issued 16 Dec. 1986 to Georg Vogl and assigned to Simrad Optronics of Oslo, Norway. This night sight module is adapted from a standard prior art catadioptric night sight module that also uses a Cassegrainian reflecting telescope system mounted in a cylindrical housing 10 with a 100 mm aperture window 11. Since this telescope system uses both a refractive and a reflecting objective lens instead of a secondary mirror to produce a final focus, its proper definition, as found on page 13 of Webster'S Ninth Collegiate Dictionary copyright 1985, is a catadioptric telescope. The prior art module, shown in the above patent, uses two opposed mirrors, the largest or primary rear mirror 12, also used by the patentee, being concave with a central output aperture. The image from the primary mirror was originally reflected along the optical axis of the night sight and through this aperture by a planar secondary front mirror that partially blocks the input aperture. An image intensifier 13, that was originally mounted behind the aperture in the primary mirror, is moved in front by the patentee. Both sights use a light relay system including a prism 14, relay collimating lens 15 and a terminating external vestibule, fitted with an image splitter 16. The vestibule is an inverted T-shaped tubular structure, one arm of which defines a thin cylindrical relay output frame 18A. This frame engages the outer surface on the objective end of a daysight 20. The splitter serves to combine the intensified image with the daysight input image at the daysight objective lens 21. In the Patentee's sight, this relay system is moved from the rear to the front of the housing. This arrangement shifts the center of gravity backward to improve the stability of the combined day/night sight system. The patentee uses a refractive lens system with element 17 to replace the secondary reflector. The vestibule or mounting structure; which is shown as cruciform in the patent, to accommodate a camera; is again a T-shaped member in the K200/250 structure. To protect the splitter 36 a cover 19 is mounted over it. To boresight the two sights a pair wedges 22 are installed between the housing and vestibule as they are assembled. The structure 23 defining the center aperture for the cassegrainian arrangement is combined with a mechanism for moving the mirror 12 to obtain a fine focus.

Figure 2:
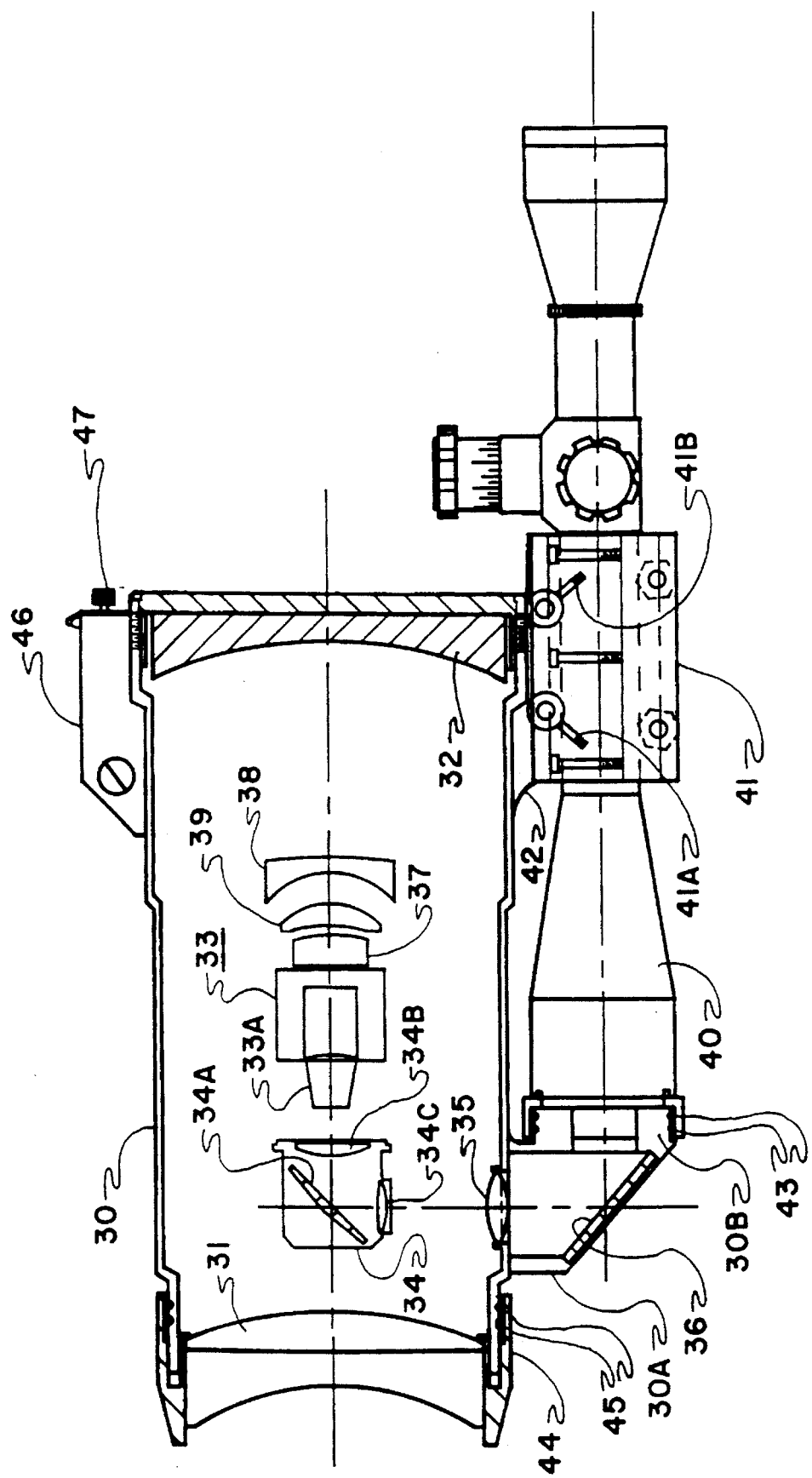
FIG. 2 shows a day/night sniper sight according to the present invention.

As shown in FIG. 2 of this application, the night sight module proposed by the applicant uses a similar module housing 30. The input window 31 is formed of a material to support the wideband sensitivity of current fiber optic wafer type image intensifiers, which extend well into the near-infrared. As in the prior art described above the size and shape of this window and that of the primary mirror 32 establish the focal length and f-number or speed of the objective lens system. Obviously, the prior art sight is adaptable to current military rifles, but to be useful at the longest ranges, the sight requires a lens f-number or speed of f/1.5 and a focal length of 150 mm compared to a focal length of 100 mm for the K200/250 sight. An 18 mm midification intensifier tube 33 is also used, which blocks only about 3% of aperture area as does the intensifier in the K200/250. The screen of the midification tube is, however, covered with a fiber optic taper 33A that varies in diameter from 18 mm to 12 mm in a length of 11.38 mm. This reduces and further intensifies the image by making use of the entire screen surface. The fiber count of the taper is equal to or greater than that of the fiber optic bundle from which the image intensifier was made, thereby preserving image resolution. The reduced image is matched to the diameter of the dayscope input aperture, allowing the daysight reticule to serve both sights on an equal basis. It also provides a smooth transition between day and night images as ambient light conditions vary.

The size of the relay mirror housing 34 and relay mirror 34A may thus be reduced to match the 12 mm output of the midifier tube. In addition to the input and output relay lenses 34B and 35, a third lens 34C is added to preserve the quality of this smaller image. The relay vestibule 30A is improved by making it integral with the module housing, thereby eliminating the need for boresighting wedges or the like. The smaller image allows the relay vestibule to have a smaller and thicker relay output frame 30B. This frame is designed to fit into rather than around the objective end of the daysight 40, thereby providing a more compact and robust structure than the prior art. The axis of the relay frame and the axis of the module housing are parallel so that both day and night sights image the same target. All optical elements support the input spectrum of the image intensifier.

A rear mounting fixture 41 is integrally or semi-permanently attached to the housing of the daysight, under the rear end of the night sight module. This same rear end has an integral down standing rail support member 42 having, for example, an inverted T-shaped shaped cross-section. The rear mounting fixture defines a matching groove into which the rail support begins to slide, just before the vestibule engages the front end of the daysight. After the vestibule is firmly engaged in that end, the thumb-set-screws 41A and 41B are tightened to firmly engage the rail support and fix it in place. To reduce vibration and exclude moisture that could obscure images and damage electrical components, rubber or plastic O-ring seals 43 are inserted in grooves provided on the relay output frame of the vestibule. These engage the end of the daysight as the vestibule is inserted.

To facilitate repair and replacement the window element or lens 31 is mounted in a snap-on frame 44. Again O-ring seals 45 are inserted in outside grooves around the end of the housing near the input aperture. The snap-on frame engages these as it slides on to create a vibration resistant waterproof seal.

A second vestibule 46, integral with the housing, is provided at the top rear of the housing. The image intensifier tube is wired into this vestibule through a window between it and the inside of housing. This vestibule contains the batteries and/or other elements that are required to supply power for the tube. A standard switch-potentiometer unit 47 normally will provide on-off and output light level control for the night sight module. A jack may be provided for an external power supply and light emitting diodes or meters may be added to assist the operator in adjusting and maintaining the image intensifier.

The presence of the night sight presents a risk of illuminating the user's face. This can be minimized by using a hood on the daysight, particularly a hood as described in Application No. 08/122,980(NVL-3004) for a "Visual Security Eyecup" by Lewis E. Lough filed 20 Sep. 1993.

While this invention has been described in terms of preferred embodiment consisting of a night sight with an f/1.5 objective having a diameter of 100 mm and an 18 mm midification image intensifier, those skilled in the art will recognize that the invention can be rescaled to operate with other image intensifiers within the spirit and scope of the appended claims.

Having thus described my invention, what I claim as new and desire to secure by Letters Patent is as follows:

1. A night vision sight module sensitive to light wavelengths in a preselected operating spectrum for a circularly cylindrical daylight telescopic weapon sight with a large diameter input objective end and a small diameter output eyepiece end on a common axis, which includes;

an opaque module housing adapted to mount on said daylight sight, with a cylindrical wall having an axis of symmetry defining a first optical axis segment parallel to said common axis, and a flat endwall normal to said first segment, said housing defining an open end greater in diameter than the aperture of said daylight sight, a closed end and a side window at least as large as the aperture of said daylight sight adjacent said open end;

said window being centered on a second optical axis segment normally intersecting said first segment;

a cylindrical image intensifier tube at least one internal element of which is made from a bundle of optical fibers and the axially normal rear and front tube faces of which define, respectively, a photoemitter light input and a phosphor screen light output coaxially mounted in said module housing along said first segment between and spaced from said closed end and said second segment so that said output face is nearest said second segment;

a plurality of primary lens elements mounted along said first axis segment to form a catadioptric telescope wherein a distant target is focussed on said input face;

plurality of secondary lens elements mounted along said first and second axis segments forming a relay means to format and transmit through said side window an image of said target emitted from said light output face substantially equivalent to but brighter than the target image propagated directly to said daylight sight;

an optical vestibule attached to the outer surface of said housing, opening into said side window, one of said secondary elements being a beam splitter defining a sloped wall of said vestibule centered on the intersection of said first and second segments;

said vestibule also including a tubular relay output frame with an axis of symmetry defining a third axial segment of said optical axis and being dimensioned to fit snugly over the objective end of said daylight sight;

said third optical axis being coplanar with said second axis and parallel to said first axis and directed so that the optical axis is U-shaped;

said splitter being mounted normal to said common plane and sloped so that its normal in said common plane bisects the angle between said second and third segments; the improvement wherein:

said vestibule is an integral non-removal part of said module housing and said relay output frame is shaped and dimensioned to fit snugly inside said objective end of said daylight sight.

2. The module of claim 1, wherein said improvement includes:

clamping means mounted on said module near said closed end to secure said closed end to the adjacent surfaces of said daylight sight after said relay frame has been inserted into said objective end of said daylight sight, said clamping means including means to quickly disconnect said night sight from said daylight sight manually without the use of tools.

3. The module of claim 1, wherein said improvement includes:

as one of said plurality of secondary lens elements a fiber optic taper containing at least as many fibers per unit of cross-section as there are in said internal element, the large end of said taper having a cross-section substantially equal to said output face and attached thereto, said side window and the small end of said taper having a cross-section that with the remaining secondary elements produces an entire image of said output face at said relay output frame that is substantially equal in cross-section to the input aperture of said daylight sight.

4. The module of claim 2, wherein said improvement includes:

as one of said plurality of secondary lens elements a fiber optic taper containing at least as many fibers per unit of cross-section as there are in said internal element, the large end of said taper having a cross-section substantially equal to said output face and attached thereto, said side window and the small end of said taper having a cross-section that with the remaining secondary elements produces an entire image of said output face at said relay output frame that is substantially equal in cross-section to the input aperture of said daylight sight.

5. The module of claim 1, wherein said improvement includes:

a set of external circumferential grooves surrounding said relay output frame; and a resilient O-ring washer mounted in each of said grooves.

6. The module of claim 1, wherein:

the cross section of the remaining ones of said plurality of secondary lens elements are substantially reduced to match the image size produced by the small end said fiber optic taper.

7. The module of claim 1, wherein:

the inner cross section of said relay output frame substantially matches the input aperture of said daysight, so as to make said frame as thick as possible.

8. The module of claim 5, wherein:

the inner cross section of said relay output frame matches the input aperture of said daysight, so as to make said frame as thick as possible and to compensate for frame material removed by providing said grooves.

* * * * *